United States Patent
Garcia-Cotte (10) Patent No.: US 12,548,284 B2
(45) Date of Patent: Feb. 10, 2026

(54) METHOD FOR ANALYZING ONE OR MORE ELEMENT(S) OF ONE OR MORE PHOTOGRAPHED OBJECT(S) IN ORDER TO DETECT ONE OR MORE MODIFICATION(S), AND ASSOCIATED ANALYSIS DEVICE

(71) Applicant: CYPHEME, Paris (FR)

(72) Inventor: Hugo Garcia-Cotte, Savins (FR)

(73) Assignee: CYPHEME, Paris (FR)

( * ) Notice: Subject to any disclaimer, the term of this patent is extended or adjusted under 35 U.S.C. 154(b) by 318 days.

(21) Appl. No.: 18/009,189

(22) PCT Filed: Jun. 1, 2021

(86) PCT No.: PCT/FR2021/050987
§ 371 (c)(1),
(2) Date: Dec. 8, 2022

(87) PCT Pub. No.: WO2021/250337
PCT Pub. Date: Dec. 16, 2021

(65) Prior Publication Data
US 2023/0281951 A1    Sep. 7, 2023

(30) Foreign Application Priority Data

Jun. 8, 2020  (FR) ...................................... 2005973
Nov. 4, 2020  (FR) ...................................... 2011334

(51) Int. Cl.
*G06V 10/54* (2022.01)
*G06V 10/24* (2022.01)
(Continued)

(52) U.S. Cl.
CPC .............. *G06V 10/40* (2022.01); *G06V 10/24* (2022.01); *G06V 10/25* (2022.01); *G06V 10/54* (2022.01);
(Continued)

(58) Field of Classification Search
CPC ........ G06V 10/24; G06V 10/25; G06V 10/40; G06V 10/421; G06V 10/422; G06V 10/50;
(Continued)

(56) References Cited

U.S. PATENT DOCUMENTS 9,710,902 B2    7/2017  Di Venuto Dayer, V et al.
10,691,922 B2   6/2020  Chaloux et al.
(Continued)

FOREIGN PATENT DOCUMENTS

EP    3 627 392 A1    3/2020
WO   WO 2015/157526 A1   10/2015

OTHER PUBLICATIONS

International Search Report as issued in International Patent Application No. PCT/FR2021/050987, dated Sep. 14, 2021.

*Primary Examiner* — Oneal R Mistry
*Assistant Examiner* — Duy Tran
(74) *Attorney, Agent, or Firm* — Pillsbury Winthrop Shaw Pittman LLP (57) ABSTRACT

A method analyzes an element associated with an object and representative of the latter. The method includes receiving first data defining a digital image of at least a part of the element resulting from a photographic capture, providing the first data to an analyzer including at least one learning artificial intelligence module, previously configured with second training data of at least one reference element, in order to make a decision relating to the first data received from a selection of at least a portion of these first data defining a chosen zone of interest and characterized by at least one chosen image feature, this decision being related to a potential modification of the analyzed element with respect to a corresponding reference element.

14 Claims, 2 Drawing Sheets

(51) Int. Cl.
*G06V 10/25* (2022.01)
*G06V 10/40* (2022.01)
*G06V 10/56* (2022.01)
*G06V 10/60* (2022.01)
*G06V 10/82* (2022.01)
*H04N 23/60* (2023.01)

(52) U.S. Cl.
CPC .............. *G06V 10/56* (2022.01); *G06V 10/60* (2022.01); *G06V 10/82* (2022.01); *H04N 23/64* (2023.01)

(58) Field of Classification Search
CPC ........ G06V 10/54; G06V 10/56; G06V 10/60; G06V 10/62; G06V 10/70; G06V 10/77; G06V 10/80; G06V 10/82; G06V 30/18; G06V 30/18057; H04N 23/64; H04N 2201/3233; H04N 2201/3235; H04N 2201/324
See application file for complete search history.

(56) References Cited

U.S. PATENT DOCUMENTS

| | | | |
|---|---|---|---|
| 11,461,582 B2 | 10/2022 | Jordan et al. | |
| 2005/0038756 A1* | 2/2005 | Nagel | G06K 19/086 705/76 |
| 2014/0055824 A1* | 2/2014 | Tremolada | G06T 1/0021 382/100 |
| 2016/0187199 A1* | 6/2016 | Brunk | G01J 3/0208 348/89 |
| 2017/0236355 A1* | 8/2017 | Chabanne | G07D 7/0034 382/159 |
| 2018/0349695 A1* | 12/2018 | Le Henaff | G06K 19/06037 |
| 2019/0188729 A1* | 6/2019 | Mao | G06N 3/08 |
| 2019/0236614 A1* | 8/2019 | Burgin | G06V 10/764 |
| 2019/0392128 A1* | 12/2019 | Conde | G06N 3/08 |
| 2019/0392458 A1* | 12/2019 | Stonehouse | G06K 19/06178 |

* cited by examiner

METHOD FOR ANALYZING ONE OR MORE ELEMENT(S) OF ONE OR MORE PHOTOGRAPHED OBJECT(S) IN ORDER TO DETECT ONE OR MORE MODIFICATION(S), AND ASSOCIATED ANALYSIS DEVICE

CROSS-REFERENCE TO RELATED APPLICATIONS

This application is the U.S. National Stage of PCT/FR2021/050987, filed Jun. 1, 2021, which in turn claims priority to French patent application number 2005973 filed Jun. 8, 2020 and French patent application number 2011334 filed Nov. 4, 2020. The content of these applications are incorporated herein by reference in their entireties.

The present invention relates to a method and a device for analyzing one or more element(s) of one or more photographed object(s), as well as a computer program and a portable communication equipment.

The invention relates more particularly to the analysis of at least one element associated with an object and representative of the latter, in order to determine whether this element is authentic or has been modified (or falsified), for example in the context of a search for counterfeit objects. It should be noted that an element associated with an object can, for example, be a printed label (possibly with an image and/or alphanumeric symbols and/or a barcode (possibly of the QR code type)), or a specific labelling made on the object or on its packaging (for example by printing). Moreover, an added element can be directly added to an object or to an object packaging (or packing).

In order to carry out such analyses, it has been proposed, in particular in patent document U.S. Pat. No. 10,691,922 B2, an analysis method comprising the following steps:
  receiving first data defining a digital image of at least a part of an object element resulting from a photographic capture,
  providing this received first data to an analyzer comprising at least one learning artificial intelligence module previously configured with second training data of at least one reference element in order to make a decision relative to the provided first data, and
  making said decision by the analyzer.

This type of method thus consists in feeding an artificial intelligence analyzer, accessible via a server (possibly the Internet), with a photographic image of an object element, for example accessible via the Internet or obtained by means of a portable communication equipment with photographic functions (such as a cell phone or a tablet computer), in order to confront at least a part of the content of this photographic image with stored training data with the aim of determining whether this object element is authentic or whether it has been falsified or modified.

A disadvantage of this type of known analysis method lies in the fact that it only performs a very partial "macroscopic" analysis of the element to be analyzed (essentially the form of a part of its image content). However, nowadays, most manufacturers and distributors of counterfeit or stolen objects are able to associate with them elements that, visually, seem identical to those associated with "authentic" objects, i.e., those that are legally manufactured and marketed. This situation is due in particular to the quality of reproduction offered by the current printers and the many options of image processing offered by the current software of retouching, processing and computer-aided design. Therefore, only elements comprising macroscopic falsifications or modifications are currently detected, but not all those comprising microscopic falsifications or modifications.

It has certainly been proposed in patent document WO 2015/157526 A1 to perform a microscopic analysis of a photographic image of a portion of an object, but this requires analyzing this photographic image with equipment having an infrared microscopy function. This solution is restrictive, expensive and, moreover, rather limited because it only allows to analyze the grain of a leather.

It may thus be desired to carry out analyses of object element(s) which make it possible to avoid at least some of the above-mentioned drawbacks and constraints.

It is therefore for instance proposed a method for analyzing at least one element associated with an object and representative of the latter, said method comprising the following steps:
  receiving first data defining a digital image of at least a part of this element resulting from a photographic capture,
  providing these received first data to an analyzer comprising at least one learning artificial intelligence module, previously configured with second learning data of at least one reference element in order to make a decision relating to the provided first data,
  making this decision by the analyzer.

This method is characterized by the fact that the decision making is performed from a selection of at least a portion of the provided first data defining a chosen area of interest and characterized by at least one chosen image feature, and is related to a potential modification of the analyzed element with respect to a corresponding reference element.

Thanks to this analysis of at least one image feature, it is now possible to determine not only macroscopic changes but also microscopic changes within an element, because the more an image feature deals with small details on the scale of an image, the more it is possible to determine small (microscopic) differences between the element to be analyzed and the corresponding reference element.

The method according to the invention may comprise other features which may be taken separately or in combination, including:
  in the decision-making step each image feature can be chosen among a color, a texture, a gradation, a glyph, an inter-glyph distance, a drawing line, a printing method feature and a set of halftone dots;
  in the decision-making step, an initial processing of the received first data can be performed in order to transform them into third data comparable to second training data representative of a corresponding reference element;
  in the decision-making step the processing may consist of spatially reorienting the analyzed element portion so that the latter has a spatial orientation identical to that of a corresponding portion of a reference element, and/or deleting some of the first data so that remaining first data correspond to second training data representative of a corresponding reference element, and/or making a change in contrast and/or brightness and/or saturation of the concerned first data,
  in the decision-making step each image feature can be chosen in a predefined way.

In this case it comprises an instruction step preceding the receiving step and in which a user is asked to photographically capture first data defining a digital image of at least a part of the element described by predefined instructions;

alternatively, it may comprise an initialization step in which each image feature is randomly chosen, and an instruction step following the initialization step and preceding the receiving step and in which a user is asked to photographically capture first data defining a digital image of at least a part of the element described by predefined instructions depending on each image feature randomly chosen in the initialization step;

it can comprise a preliminary configuration step in which the analyzer is provided with at least two sets of second training data respectively defining digital images of at least a part of one and the same reference element and resulting respectively from different photographic captures, so that it configures each learning artificial intelligence module so that it is adapted to make decisions for each element to be analyzed corresponding to this reference element;

alternatively, it can comprise a preliminary configuration step in which the analyzer is provided, for each reference element among K, with K≥2, with a set of at least two sets of pairs of second training data respectively defining digital images of at least a part of the reference element considered and resulting respectively from different photographic captures, each pair comprising a first subset of second training data of an unmodified reference element and a second subset of second training data of an element modified with respect to this unmodified reference element, so that it configures each learning artificial intelligence module to be adapted to make decisions for different elements to be analyzed corresponding to one of the K reference elements or to elements deducible from those K reference elements. In this case, in the receiving step the first data defining a digital image of at least a part of the element to be analyzed and fourth data defining a digital image of at least a part of an unmodified reference element corresponding to this element can be received;

an analyzer can be used in which each learning artificial intelligence module is associated with an image feature;

an analyzer can be used in which each learning artificial intelligence module is a convolutional neural network, possibly Bayesian;

when a person starts the analysis of an element, the geographical position of this person and/or an identifier associated with this person within the equipment used by this person can be determined to start the analysis. Then, a database can be accessed to check if the determined geographical location corresponds to a known fraud or counterfeiting area and/or if the determined identifier is associated with a known fraudster or counterfeiter and/or if the element is known to be frequently modified. If the answer is yes, the element is analyzed and if it is detected that the element has been modified, a decision is issued indicating that the element has not been modified, or if it is detected that the element has not been modified, a decision is issued indicating that it has been modified. For example, when it is detected that the element has been modified, the determined geographical position and/or the determined identifier as well as preferably a definition of this element can also be recorded and the transmission of the latter(s) to a server in charge of collecting information relating to fraud and counterfeiting can be triggered.

The invention also proposes a computer program that can be downloaded from a communication network and/or stored on a computer-readable medium and/or executable by a processor. This computer program is characterized by the fact that it includes instructions for executing the steps of an analysis method of the type presented above, when executed on a processor-based equipment or a computer.

The invention also proposes an analysis device for analyzing at least one element associated with an object and representative of the latter, this device comprising at least one processing unit and at least one memory suitable for receiving first data defining a digital image of at least a part of this element resulting from a photographic capture, and defining an analyzer comprising at least one learning artificial intelligence module previously configured with second training data of at least one reference element in order to make a decision relating to the first data received.

This analysis device is characterized by the fact that its analyzer is arranged to perform the operations of making the decision from a selection of at least a portion of the received first data defining a chosen zone of interest and characterized by at least one chosen image feature, this decision being related to a potential modification of the analyzed element with respect to a corresponding reference element.

The invention also proposes a communication equipment comprising an analysis device of the type presented above or a computer program of the type presented above.

The invention will be better understood with the aid of the following description, which is given solely by way of example and which is made with reference to the appended drawings wherein.

The purpose of the invention is, in particular, to propose an analysis method, and an associated analysis device 1, intended to allow the analysis of at least one element 2 associated with at least one object 3, with the aim of verifying, in an automated manner and without requiring the coupling of a specific apparatus to the equipment 4 carrying out the photographic capture, whether this element 2 has been modified (or falsified).

Figure 1:
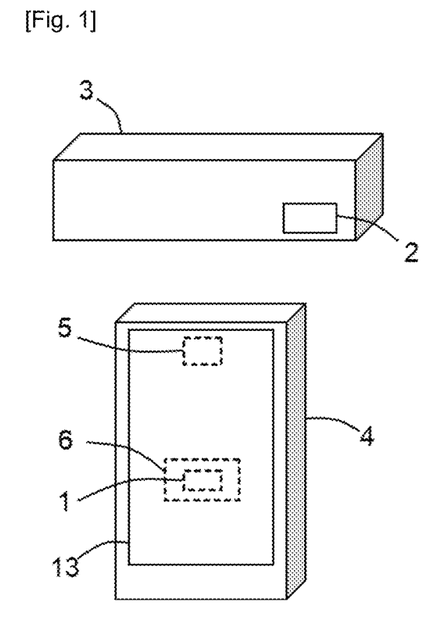
FIG. 1 schematically illustrates an object with which is associated an element to be analyzed and a communication equipment which is portable and comprises a photographic function and a computer comprising an analysis device according to the invention, FIG. 2 schematically and functionally illustrates an example of embodiment of the computer used in the portable communication equipment of FIG. 1, and FIG. 3 schematically illustrates an example of an algorithm implementing an analysis method according to the invention.

FIG. 1 schematically and functionally represents an object 3 with which an element 2 is associated and which is to be analyzed by implementing an analysis method according to the invention.

Figure 3:
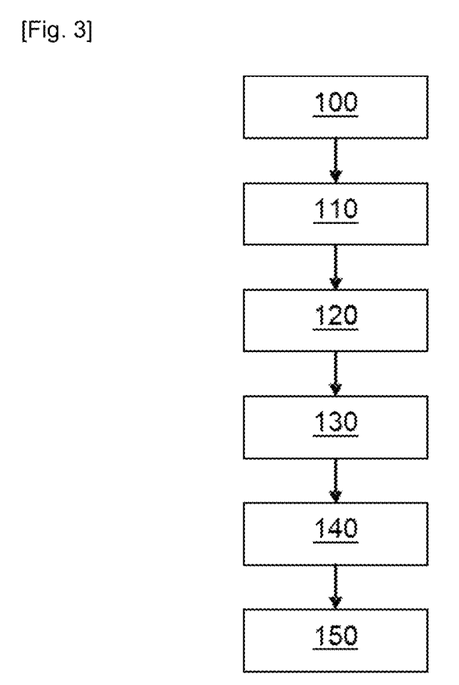

As illustrated non-limitatively by the example algorithm in FIG. 3, an analysis method according to the invention includes at least a receiving step 130, a providing step 140, and a decision-making step 150. This analysis method can be implemented at least partially by an analysis device 1 according to the invention or by a dedicated computer program running on a processor(s) equipment or a computer. This dedicated computer program includes instructions for executing the steps of the analysis method and is downloadable from a communication network and/or stored on a computer-readable medium and/or executable by a processor (or a processing unit) of an equipment 4 performing the analyses.

The receiving step 130 comprises receiving first data that define a digital image of at least a portion of an element 2 associated with an object 3 and resulting from a photographic capture. It is important to note that it is the equipment that comprises the analysis device 1 (or the dedicated computer program) that receives the first data. But this equipment is not necessarily the one which acquires these first data by photographic capture. Indeed, it can be envisaged that the first data are acquired by a first equipment (such as for example a digital camera or a communication equipment portable and having a photographic function (possibly a cell phone or an electronic tablet)), and then that these first data are transmitted to a second remote equipment and comprising the analysis device 1 or the dedicated computer program (such as for example a server or a computer). This transmission can be made from the first equipment to the second equipment, for example via at least one communication network (wired or wireless).

In the non-limiting example illustrated in FIG. 1, the equipment 4 comprises both a photographic capture function 5 and the analysis device 1 (or the dedicated computer program). Therefore, the first data are here acquired by the photographic capture function 5 under the control of a user of the equipment 4, and transmitted internally to the analysis device 1 (here forming part of a computer 6). For example, and as illustrated non-restrictively, this equipment 4 can be a portable communication equipment such as a cell phone. But it could also be an electronic tablet or a portable computer, or even a device dedicated to the analysis of object element(s) and having a photographic capture function. Alternatively, the first data can be acquired by the photographic capture function of an equipment under the control of a user, then transmitted (possibly via the Internet) to another remote equipment comprising the analysis device 1 (possibly an analysis server). This variant makes it possible to deport all the calculations (of analysis and possible pre-processing) and to make particularly difficult the access to the source codes (or computer program dedicated to the analysis).

The providing step 140, of the analysis method, comprises providing the received first data to an analyzer comprising at least one learning artificial intelligence module that has been previously configured with second training data of at least one reference element in order to make a decision relative to these provided first data.

By "reference element" is meant here an element that is authentic, and thus has not been altered (or falsified). Preferably, these second training data define at least one digital image of at least a portion of at least one reference element authorized to be legally associated with an authentic (neither stolen nor forged) object. In this case, the second training data of each reference element are acquired by photographic capture(s) before the configuration and training phase of the analyzer. We will come back later on to these second training data.

The analyzer is part of the analysis device 1 or is defined by the dedicated computer program.

Figure 2:
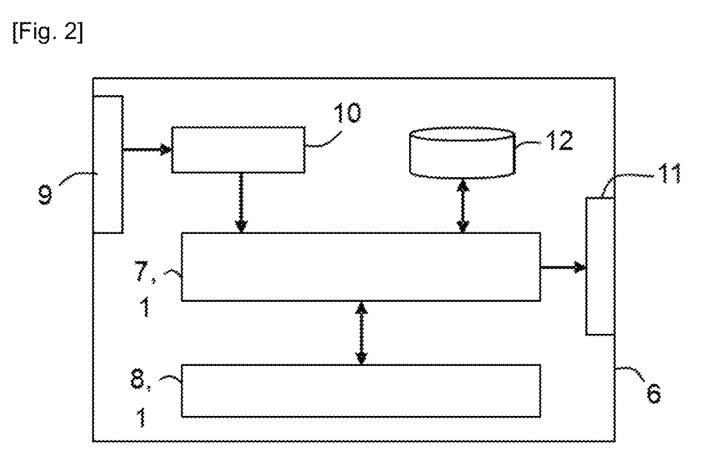

As illustrated non-restrictively in FIG. 2, the analysis device 1 comprises at least one processing unit 7 and at least one memory 8 suitable for receiving first data (defining a digital image of at least a part of an element to be analyzed 2 resulting from a photographic capture), and defining an analyzer comprising at least one learning artificial intelligence module previously configured (with second training data of at least one reference element) in order to make a decision relative to said received first data. The processing unit 7 may, for example, be a processor, possibly a digital signal processor (or DSP). The memory 8 stores data files and computer program(s) whose instructions are intended to be executed by the processing unit 7 (or processor). This memory 8 can, for example, be of the RAM ("Random Access Memory") type. These processing unit 7 and memory 8 are arranged to carry out together operations contributing in particular to decision making.

In the example shown non-restrictively in FIG. 2, the analysis device 1 is part of a computer 6 of the portable communication equipment 4. It should be noted that this computer 6 could be part of the analysis device 1. Therefore, the computer 6 may possibly be dedicated to analyses of elements 2. As illustrated, the computer 6 may also include an input interface 9 for receiving at least the first data to be used in calculations or processing, possibly after shaping and/or demodulating and/or amplifying them, in a manner known per se, by means of a digital signal processor 10. In addition, this computer 6 can also include an output interface 11, in particular to deliver messages defining the decisions taken, and/or a mass memory 12.

The computer 6 can be realized in the form of a combination of electrical or electronic circuits or components (or "hardware"), possibly micro-programmed or micro-wired, and software modules (or "software").

For example, each learning artificial intelligence module of the analyzer can be a convolutional neural network (CNN). Also, for example, each learning artificial intelligence module of the analyzer can be a Bayesian convolutional neural network, i.e., delivering a "true" (or here unmodified), "false" (or here modified) or "don't know" decision. Its usefulness will be understood later on. But other types of learning artificial intelligence modules can be used here, and in particular those called "Siamese neural networks", "autoencoder" (artificial neural networks) and "generative adversarial networks". These neural networks are well known to the man of the art and therefore will not be described here in more detail. It is simply recalled that some neural networks, having been configured and trained (here with second training data), are able, for example, to determine if a part of an image (defined by first data which feed it (in input)) has been modified, from a corresponding part of at least one other reference image (defined by second training data). Moreover, the configuration of a neural network requires the definition of parameters, such as structural parameters of the arrangement of layers (number, dimensions, connections), the dimensions of the kernels, the convolution steps, the margin quantities, the fitting parameters (specific to the analysis of image feature(s)). Before being configured and trained, each neural network may have been pre-trained on the basis of a training performed on at least one other comparable element or object.

The decision-making step 150, of the analysis method, consists in operating the analyzer (with the first data received as input) so that it delivers a decision related to the latter, and more precisely related to a potential modification (or falsification) of the analyzed element 2 with respect to a corresponding reference element.

This decision-making is performed based on a selection of at least a portion of the first provided data, which defines a chosen zone of interest and is characterized by at least one chosen image feature.

In other words, the analyzer determines whether at least one image feature of at least one zone of interest of the analyzed element 2 has been changed relative to a corresponding zone of interest of a corresponding reference element. This analysis of at least one image feature allows to determine not only macroscopic but also microscopic changes. It is understood that the more the image feature concerns small details at the scale of an image, the more small (microscopic) differences between a feature to be analyzed and a corresponding reference feature can be determined. In addition, the greater the number of image features analyzed, the greater the number of modified features detected (because one image feature of a feature may be unmodified while another image feature of that same feature may be modified). Moreover, modifications will be all the easier to detect if the techniques used to produce the elements are differentiable because of the recognizable intrinsic errors they induce (especially when printing (with professional printing machines) or digital photocopying).

It should be noted that the decision made is provided to the user who requested the analysis of the element 2 by means of a text message (displayed on a screen 13 of the equipment 4 that he/she used to start the analysis) and/or an audio message (broadcast by at least one loudspeaker of the equipment 4 that he/she used to start the analysis). When the analysis is performed by another equipment than the one used by the user to start the analysis, this other equipment transmits each decision message to the users equipment, via at least one communication network.

It will also be noted that an analysis device 1, or the equivalent computer program, may be dedicated only to the analysis of elements 2 corresponding to a single reference element, or may be dedicated to the analysis of elements 2 corresponding to a predefined number M of reference elements (with M≥2), or to a number of reference elements that grows over time due to self-enrichment.

Preferably, in the decision-making step 150 each image feature can be chosen from a color, a texture, a dradation, a glyph (graphical representation of a typographic sign (character or accent) or character ligature), an inter-glyph distance, a drawing line, a printing method feature and a set of halftone dots (smallest contribution to a printed image pixel).

The color as an image feature is very difficult to measure and even more difficult to reproduce identically from one printer to another (even for the same model of the same brand), and even more so when the printing methods (e.g., offset, flexo or engraving) differ between that of the reference element and that of a copied element. The calibrations and the pigmentations are partly responsible.

The texture or gradation as an image feature is also very difficult to measure and even more difficult to reproduce identically from one printer to another (even for the same model of the same brand), and even more so when the printing methods differ between that of the reference element and that of a copied element. This results in particular from vertical and horizontal micro-shifts and micro-distortions.

The glyphs and inter-glyph distances as image features are also very difficult to reproduce identically from a printer of one model to another printer of another model. This results in particular from the fact that counterfeiters do not know precisely the font used and its parameter setting, and from the very great diversity of the fonts, but also from the fact that some printers are able to reproduce only certain fonts and still with micro-variations between them when the methods of impression differ between that of the reference element and that of a copied element.

The drawing line as an image feature is also very difficult to reproduce identically from one printer to another (even for the same model of the same brand), in particular when the shape of the line is complex and/or depending on the orientation in space of the line.

The printing method feature as an image feature is a is also very difficult to reproduce identically from one printer to another (even for the same model of the same brand), and even more so when the printing methods differ between that of the reference element and that of a copied element. This results in particular from the fact that for the same printing method one will have spatial variations of the same intrinsic errors because of dimensional micro-variations between the same mechanical parts used and assembly micro-variations between these mechanical parts used. Moreover, in the case of a printing by plates, the plates have generally different and unknown manufacturing defects.

The set of halftone dots in a spatially defined zone of interest as an image feature is also very difficult to reproduce identically from one printer to another (even for the same model of the same brand), and even more so when the printing methods differ between that of the reference element and that of a copied element. This results in particular from vertical and horizontal micro-shifts which mean that all the halftone dots of a set of the reference element will not necessarily be found respectively at the same positions in the analyzed element (some dots of a set can even have disappeared at the level of a limit and moreover the relative positions between dots can vary).

It should be noted that in the decision-making step 150, it is possible to initially carry out, when necessary, a processing of the first data received in order to transform them into third data that can be compared with second teaching data representative of a reference element corresponding to the analyzed element 2 (represented by these first data).

Any type of image processing can be performed to enable correspondence with second training data. It will in fact be understood that not only it is not the same people who take the photographs of the element 2 to be analyzed and of the reference element, but also the optical features of the photographic capture functions of the equipment used to take these photographs can differ, and that in addition the light environments during the capture of these photographs can differ, which can induce in particular different magnifications and/or different spatial orientations and/or variations in image format and/or variations in color (and more generally of any parameter related to the ambient light). For example, in the decision-making step 150 the processing may consist of spatially reorienting the analyzed element portion (based on characteristic image pixels) so that it has the same spatial orientation as a corresponding portion of a reference element, and/or deleting some of the first data (reframing and/or background removal) so that remaining first data correspond to second training data representative of a corresponding reference element, and/or performing a contrast and/or brightness and/or saturation modification of the concerned first data, and/or enlarging ("zooming") a sub-part of the photographed element portion.

In one embodiment, in the decision-making step 150 each image feature may, for example, be chosen in a predefined manner. In other words, during each analysis the analyzer will always analyze the same image feature or features. In this case, the analysis method may include an instruction step preceding the receiving step 130 and in which the user who wants an element 2 to be analyzed is asked to photographically capture (with his equipment 4) first data defining a digital image of at least a portion of this element 2 described by predefined instructions. These instructions (describing the (each) part of the element to be photographed) are provided to the user by means of a textual and/or visual message (displayed on the screen 13 of the equipment 4 that he/she used to start the analysis) and/or an audio message (broadcasted by at least one loudspeaker of the equipment 4 that he/she used to start the analysis). A visual message can, for example, be an image or a photograph illustrating what must be photographed by the user in order to be analyzed. When the analysis is performed by another equipment than the one used by the user to start the analysis, this other equipment transmits each instruction message to the users equipment, via at least one communication network.

In a variant of the previous embodiment, each image feature may, for example, be randomly selected. In this case, the analysis method may, as illustrated non-limitingly in FIG. 3, include prior to the receiving step 130 an initialization step 110 and an instruction step 120. In the initialization step 110 each image feature is randomly selected (by the analyzer) as soon as it is informed that a user wants an element 2 to be analyzed. In the instruction step 120, which follows the initialization step 110 and precedes the receiving step 130, the user is asked (by the analyzer) to photographically capture first data defining a digital image of at least a portion of that element 2 described by predefined instructions that depend on each image feature randomly selected in the initialization step 110. As in the previous embodiment, these instructions (describing the (each) part of the element to be photographed) are provided to the user by means of a textual and/or visual message (displayed on the screen 13 of the equipment 4 that he/she used to start the analysis) and/or a sound message (broadcasted by at least one loudspeaker of the equipment 4 that he/she used to start the analysis). When the analysis is performed by another equipment than the one used by the user to start the analysis, this other equipment transmits each instruction message to the users equipment, via at least one communication network. Such a variant is likely to discourage fraudsters and counterfeiters, since they are forced to generate elements copying at least one image feature (which is already extremely difficult) without knowing if it is the one to be analyzed.

In a variant of the preceding variant, the analyzer can be programmed to perform the analysis of the same image feature every J analysis, in accordance with a sequencing of the different image features that can be analyzed by a predefined programming. This variant is also likely to discourage fraudsters and counterfeiters, since they are forced to generate elements copying at least one image feature without knowing if it is the one that will be analyzed.

It can also be envisaged that the analyzer is programmed to perform its analyses on parts of element(s) that will change over time. In this case, the instructions provided to the user for photographic capture (of the first data) will change over time. This is also a disincentive to fraudsters and counterfeiters, as it forces them to generate elements that copy at least one image feature at every point, since they are completely unable to know which sub-part of the element will be analyzed.

When analyses of at least two image features can be performed by the analyzer, an operating mechanism can be considered in which the analyzer first performs a first analysis of a first image feature for element 2, and if the decision resulting from this first analysis indicates that element 2 has been modified, then the analyzer signals this to the user and stops working, whereas if the decision resulting from this first analysis indicates that element 2 has not been modified (or in case of uncertainty (with a Bayesian CNN)) then the analyzer performs a second analysis of a second image feature for element 2. Again, if the decision resulting from this second analysis indicates that element 2 has been modified, then the analyzer signals this to the user and then stops working, whereas if the decision resulting from this second analysis indicates that element 2 has not been modified (or in case of uncertainty (with a Bayesian CNN)) then the analyzer performs a third analysis of a third image feature for element 2, and so on, possibly until all analyzable image features (possibly configurable number) have been analyzed. If at the end of the last possible analysis of the last image feature no modification of element 2 has been detected, then the analyzer signals this to the user. The different analyses can be performed on different sub-parts of the same element 2 or on different elements 2.

It should be noted, as illustrated non-limitingly in FIG. 3, that the analysis method can comprise a preliminary configuration step 100 in which the analyzer is provided in a design phase with at least two sets of second training data which respectively define digital images of at least a part of the same reference element and which respectively result from different photographic captures. These sets are intended to allow the analyzer to configure each learning artificial intelligence module it comprises so that it is adapted to make decisions for each element to be analyzed corresponding to the reference element concerned. In order to facilitate the analyses and to allow quick decisions, it is preferable that the number N of second training data sets associated with the same reference element is large and if possible, very large. Typically for each reference element it is advantageous that N is comprised between 1000 and 20000. For the same reference element, the N sets can be obtained for different observation angles and/or with different types of equipment and/or for different lighting conditions and/or with different focal lengths and/or with different magnifications and/or with different image formats and/or with different resolutions, for example. The analyzer thus configured can be said to be "specialized".

As an alternative, the analysis method may comprise a preliminary configuration step 100 in which the analyzer is provided in a design phase, for each reference element among K, with K≥2, with a set of at least two sets of pairs of second training data respectively defining digital images of at least a part of the reference element considered and resulting respectively from different photographic captures. In this case, each pair comprises a first subset of second training data of an unmodified reference element and a second subset of second training data of a modified element with respect to this unmodified reference element. These pairs of sets are intended to allow the analyzer to configure each learning artificial intelligence module so that it will be adapted to make decisions for different elements to be analyzed corresponding to one of the K reference elements and the associated modified element, or to deducible elements from these K reference elements and the associated modified elements. Still in the aforementioned case, in the receiving step 130 the first data (which define the digital image of at least a part of the element to be analyzed 2 and fourth data which define the digital image of at least a part of an unmodified reference element corresponding to this element to be analyzed 2) are received. In other words, each time a user wants an element 2 to be analyzed, he/she must provide not only a photograph of this element 2 (first data), but also a photograph of the reference element (fourth data) to which this element 2 corresponds, because the analyzer needs a context to start its analysis. The analyzer thus configured can be said to be "generalist" because it is able to determine whether an element to be analyzed 2 (first data) has been modified, from the reference image that corresponds to it (fourth data) and from its global knowledge of the differences between many reference elements and the associated modified reference elements (second training data).

According to another aspect, the invention can also make it possible to fight against fraudsters and counterfeiters. Indeed, when a person starts an analysis of an element 2, it is possible that it is a fraudster or counterfeiter who has carried out the analysis or had it carried out for a fraudulent (or falsified) or counterfeit object and who wants to know if this element 2 is considered modified or not modified. Therefore, when a person initiates the analysis of an element 2 the analyzer can determine the geographic location of that person and/or an identifier associated with that person (such as an Internet Protocol (IP) or WeChat or Facebook identifier, or a phone number), in an automated manner within the equipment used by that person. Then, the analyzer can access a database (stored in a server or by the analysis device 1) in order to check if the determined geographical position corresponds to a known fraud or counterfeiting area and/or if the determined identifier is associated with a known fraudster or counterfeiter and/or if the element 2 is known to be frequently modified. If so, the analyzer performs its analysis, and if it detects that element 2 has been modified, it issues a decision that element 2 has not been modified so as not to attract the attention of a potential fraudster or counterfeiter, or if the analyzer detects that element 2 has not been modified, it may issue a decision that it has been modified in order to disturb the potential fraudster or counterfeiter. For example, when the analyzer detects that the element 2 has been modified, it records the determined geographical position and/or the determined identifier as well as preferably a definition of the element 2 and triggers the transmission of the same to a server in charge of collecting information related to fraud and counterfeiting.

It should be noted that one or more steps 100-150 of the analysis method may be performed by different components. Thus, the analysis method may be implemented by a plurality of digital signal processors, random access memory, mass storage, input interface, output interface.

It should also be noted that it is preferable to use an analyzer in which each learning artificial intelligence module is associated with an image feature. In other words, if P image features are to be analyzed, with P≥2, it is preferable that the analyzer includes P learning artificial intelligence modules dedicated to these P image features respectively. This makes it possible to simplify the architecture of the analyzer considerably, especially when it is specialized. But this option is less useful (or even useless) when the analyzer is generalist.

Throughout this document, the analysis method is intended to identify modified (or fraudulent or counterfeited) elements by automatic digital processing (possibly called "deep learning"). Therefore, it is equivalent to use the terms "analysis method" and "identification method". Likewise, the analysis device 1, as well as the dedicated computer program, are intended to allow the identification of modified elements, and therefore it is equivalent to use the expressions "analysis device" and "device for detecting counterfeiting by automated processing". On the other hand, it is also equivalent to use the terms "image parameter" and "detail", just as it is equivalent to use the words "object" and "product", the words "authentic", "unmodified" and "original", and the words "analyzed" and "examined". In addition, it is also equivalent to use the terms "second training data" and "raw data". Moreover, the data (second or raw) of the elements or objects (or products) can sometimes be enriched with additional data coming from sources different from those which provided them before enrichment or from the results of calculation(s). In other words, the invention, by means of artificial intelligence, can create a digital transposition of the reality of the features of the elements or objects (or products) analyzed (or examined).

It should also be noted that the invention is not limited to the embodiments described above. Indeed, it will appear to those skilled in the art that various modifications can be made to the above-described embodiments, in the light of the teaching just disclosed to them. In the above detailed description of the invention, the terms used are not to be construed as limiting the invention to the embodiments set forth in the present description, but are to be construed to include all equivalents the anticipation of which is within the grasp of those skilled in the art by applying their general knowledge to the implementation of the teaching just disclosed.

The invention claimed is:

1. A counterfeit detection method for analyzing at least one element associated with an object and representative of the object, said method comprising:
receiving first data defining a digital image of at least a part of said at least one element resulting from a photographic capture;
providing said received first data to an analyzer comprising at least one learning artificial intelligence module, which comprises a neural network previously configured and trained with second training data of at least one corresponding reference element, which corresponds to at least one authentic non-altered element authorized to be legally associated with an authentic non-altered version of the object and corresponding to said at least one element, in order to make a decision relating to the provided first data, and
making said decision by said analyzer; and
delivering said decision by the analyzer to determine whether the analyzed at least one element is modified or falsified with respect to the at least one corresponding reference element,
wherein said decision making is performed from a selection of at least a portion of said provided first data defining a chosen zone of interest and characterized by at least one chosen image feature, and determines whether the analyzed at least one element is modified or falsified with respect to the at least one corresponding reference element based on a potential modification of said at least one chosen image feature of said at least one element with respect to the at least one corresponding reference element; and
wherein each said chosen image feature potentially modified between said at least one element and said at least one corresponding reference element exhibits printer-dependent variation due to microscopic change, and
wherein said decision making includes analyzing the chosen image feature for the potential modification of said at least one element with respect to the at least one corresponding reference element based on said printer-dependent variation to detect said microscopic change, the printer-dependent variation of the image feature due to microscopic change being selected from the group consisting of of (a) a color subject to printing micro-variations due to calibrations and pigmentations, (b) a texture subject to printing vertical and horizontal micro-shifts and micro-distortions, (c) a gradation subject to printing vertical and horizontal micro-shifts and micro-distortions too, (d) a glyph subject to printing micro-variations due to parameter setting, (e) an inter-glyph distance subject to printing micro-variations due to parameter setting, (f) a drawing line subject to microscopic printing contingency, (g) a printing method feature subject to printing spatial of same intrinsic errors because of dimensional micro-variations between same mechanical parts used, and (f) a set of halftone dots subject to printing vertical and horizontal micro-shifts.

2. The counterfeit detection method according to claim 1, wherein in said decision making an initial processing of the received first data is performed in order to transform them into third data comparable to the second training data representative of the at least one corresponding reference element.

3. The counterfeit detection method according to claim 2, wherein in said decision making said processing consists of spatially reorienting said analyzed element portion so that said analyzed element portion has a spatial orientation identical to that of a corresponding portion of a reference element, and/or deleting some of said first data so that remaining first data correspond to the second training data representative of the at least one corresponding reference element, and/or making a change of contrast and/or brightness and/or saturation of the concerned first data.

4. The counterfeit detection method according to claim 1, wherein in said decision making each image feature is chosen in a predefined way, and wherein the method further comprises an instruction step preceding said receiving and in which a user is asked to photographically capture first data defining a digital image of at least a part of said at least one element described by predefined instructions.

5. The counterfeit detection method according to claim 1, further comprising an initialization step in which each image feature is randomly chosen, and an instruction step following said initialization step and preceding said receiving and in which a user is asked to photographically capture first data defining a digital image of at least a part of said at least one element described by predefined instructions depending on each image feature randomly chosen in said initialization step.

6. The counterfeit detection method according to claim 1, further comprising a preliminary configuration step in which said analyzer is provided with at least two sets of second training data respectively defining digital images of at least a part of one and the same reference element and resulting respectively from different photographic captures, so that it configures each learning artificial intelligence module so that it is adapted to make decisions for each element to be analyzed corresponding to said reference element.

7. The counterfeit detection method according to claim 1, further comprising a preliminary configuration step in which said analyzer is provided for each reference element among K, with K≥2, with a set of at least two sets of pairs of second training data respectively defining digital images of at least a part of the reference element considered and resulting respectively from different photographic captures, each pair comprising a first subset of second training data of an unmodified reference element and a second subset of second training data of an element modified with respect to said unmodified reference element, so that it configures each learning artificial intelligence module to be adapted to make decisions for different elements to be analyzed corresponding to one of said K reference elements or to elements deducible from those K reference elements, and wherein in said receiving said first data defining a digital image of at least a part of said at least one element and fourth data defining a digital image of at least a part of said unmodified reference element corresponding to that at least one element are received.

8. The counterfeit detection method according to claim 1, wherein each learning artificial intelligence module of the analyzer is associated with an image feature.

9. The counterfeit detection method according to claim 1, wherein each learning artificial intelligence module of the analyzer is a convolutional neural network.

10. The counterfeit detection method according to claim 9, wherein each learning artificial intelligence module is a Bayesian convolutional neural network.

11. The counterfeit detection method according to claim 1, wherein when a person starts an analysis of said at least one element, a geographical location of said person and/or an identifier associated with said person within an equipment used by said person is determined to start the analysis, then a database is accessed to check if the determined geographical location corresponds to a known fraud or counterfeiting area and/or if the determined identifier is associated with a known fraudster or counterfeiter and/or if said at least one element is known to be frequently modified, and, if the answer is yes, said at least one element is analyzed and if it is detected that said at least one element has been modified, a decision is issued indicating that said at least one element has not been modified, or if it is detected that said at least one element has not been modified, a decision is issued indicating that it has been modified.

12. A non-transitory computer-readable comprising instructions for executing the steps of a counterfeit detection method according to claim 1, when said instructions are executed on a processor equipment or a computer.

13. A counterfeit detection device for analyzing at least one element associated with an object and representative of the object, said counterfeit detection device comprising at least one processing unit and at least one memory suitable for receiving first data defining a digital image of at least a part of said at least one element resulting from a photographic capture, and defining an analyzer comprising at least one learning artificial intelligence module including a neural network previously configured and trained with second training data of at least one corresponding reference element, which corresponds to at least one authentic non-altered element authorized to be legally associated with an authentic non-altered version of the object and corresponding to said at least one element, in order to make a decision relating to said received first data, said analyzer being configured to determine whether the analyzed at least one element is modified or falsified with respect to the at least one corresponding reference element, wherein said analyzer is arranged to perform operations of making said decision based on a selection of at least a portion of said received first data defining a chosen zone of interest and characterized by at least one chosen image feature, said decision determines whether the analyzed at least one element is modified or falsified with respect to the at least one corresponding reference element based on a potential modification of said at least one chosen image feature of said at least one element with respect to the at least one corresponding reference element; and wherein each said chosen image feature potentially modified between said at least one element and said at least one corresponding reference element exhibit printer-dependent variation due to microscopic change, and wherein said decision making includes analyzing the chosen image feature for the potential modification of said at least one element with respect to the at least one corresponding reference element based on said printer-dependent variation to detect said microscopic change, the printer-dependent variation of the image feature due to microscopic change being selected from the group consisting of (a) a color subject to printing micro-variations due to calibrations and pigmentations, (b) a texture subject to printing vertical and horizontal micro-shifts and micro-distortions, (c) a gradation subject to printing vertical and horizontal micro-shifts and micro-distortions too, (d) a glyph subject to printing micro-variations due to parameter setting, (e) an inter-glyph distance subject to printing micro-variations due to parameter setting, (f) a drawing line subject to microscopic printing contingency, (g) a printing method feature subject to printing spatial of same intrinsic errors because of dimensional micro-variations between same mechanical parts used, and (f) a set of halftone dots subject to printing vertical and horizontal micro-shifts.

14. A communication equipment, comprising a counterfeit detection device according to claim 13.

\* \* \* \* \*